United States Patent
Hillis et al.

(10) Patent No.: US 8,369,659 B2
(45) Date of Patent: Feb. 5, 2013

(54) HIGH-Q RESONATORS ASSEMBLY

(75) Inventors: W. Daniel Hillis, Encino, CA (US); Roderick A. Hyde, Redmond, WA (US); Nathan P. Myhrvold, Medina, WA (US); Clarence T. Tegreene, Bellevue, WA (US); Lowell L. Wood, Jr., Bellevue, WA (US)

(73) Assignee: The Invention Science Fund I LLC

( * ) Notice: Subject to any disclaimer, the term of this patent is extended or adjusted under 35 U.S.C. 154(b) by 1048 days.

(21) Appl. No.: 12/286,312

(22) Filed: Sep. 29, 2008

(65) Prior Publication Data

US 2009/0046976 A1 Feb. 19, 2009

Related U.S. Application Data

(63) Continuation-in-part of application No. 11/386,211, filed on Mar. 22, 2006, and a continuation-in-part of application No. 11/386,212, filed on Mar. 22, 2006, and a continuation-in-part of application No. 11/386,227, filed on Mar. 22, 2006, and a continuation-in-part of application No. 12/218,043, filed on Jul. 9, 2008.

(51) Int. Cl.
*G02F 1/295* (2006.01)
*H01S 3/083* (2006.01)

(52) U.S. Cl. ............ 385/8; 385/1; 385/2; 385/3; 385/4; 385/5; 385/6; 385/7; 385/9; 385/10; 385/14; 372/94; 372/97; 372/98

(58) Field of Classification Search ............... 385/1–10, 385/14; 372/94, 97, 98
See application file for complete search history.

(56) References Cited

U.S. PATENT DOCUMENTS

| | | | |
|---|---|---|---|
| 5,482,890 A | 1/1996 | Liu et al. | |
| 5,532,184 A | 7/1996 | Kato | |
| 5,790,583 A * | 8/1998 | Ho | 372/92 |
| 5,878,070 A * | 3/1999 | Ho et al. | 372/92 |
| 5,985,353 A | 11/1999 | Lawton et al. | |
| 6,466,603 B1 | 10/2002 | Martinez | |
| 6,532,326 B1 * | 3/2003 | Hutchinson et al. | 385/37 |
| 6,636,668 B1 * | 10/2003 | Al-hemyari et al. | 385/40 |
| 6,661,950 B1 * | 12/2003 | Strecker | 385/30 |
| 6,665,486 B2 * | 12/2003 | Tomita | 385/147 |
| 6,711,200 B1 * | 3/2004 | Scherer et al. | 372/64 |
| 6,734,465 B1 | 5/2004 | Taskar et al. | |
| 6,751,368 B2 * | 6/2004 | Lim et al. | 385/14 |
| 6,767,702 B2 | 7/2004 | Mirkin et al. | |
| 6,819,845 B2 | 11/2004 | Lee et al. | |
| 6,839,488 B2 * | 1/2005 | Gunn, III | 385/40 |
| 6,895,148 B2 * | 5/2005 | Gunn, III | 385/50 |
| 6,925,226 B2 * | 8/2005 | Lim et al. | 385/32 |
| 6,965,128 B2 * | 11/2005 | Holm et al. | 257/103 |
| 7,068,898 B2 | 6/2006 | Buretea et al. | |
| 7,460,746 B2 * | 12/2008 | Maleki et al. | 385/27 |
| 2001/0004411 A1 * | 6/2001 | Yariv | 385/28 |
| 2001/0016095 A1 * | 8/2001 | Tomita | 385/15 |
| 2001/0033371 A1 | 10/2001 | Lawandy | |
| 2002/0090160 A1 * | 7/2002 | Lim et al. | 385/11 |
| 2002/0122615 A1 | 9/2002 | Painter et al. | |
| 2003/0194169 A1 | 10/2003 | Flory | |
| 2005/0002604 A1 | 1/2005 | Verbrugge et al. | |
| 2005/0073734 A1 | 4/2005 | Verma et al. | |

(Continued)

OTHER PUBLICATIONS

Matsko et al.; "Optical Resonators With Whispering-Gallery Modes—Part I: Basics"; IEEE Journal of Selected Topics in Quantum Electronics; bearing a date of Jan./Feb. 2006; vol. 12, No. 1; © 2006 IEEE.

(Continued)

*Primary Examiner* — Brian M. Healy
*Assistant Examiner* — Guy Anderson

(57) ABSTRACT

An electromagnetically responsive element includes sets of arrangements of self-resonant bodies, such as atoms or quantum dots that form an effective dielectric constant, typically at or near a resonance.

5 Claims, 10 Drawing Sheets

U.S. PATENT DOCUMENTS

| | | | |
|---|---|---|---|
| 2005/0158898 A1* | 7/2005 | Scherer | 438/29 |
| 2005/0180680 A1* | 8/2005 | Kong | 385/14 |
| 2005/0225828 A1 | 10/2005 | Zakhleniuk et al. | |
| 2005/0233487 A1 | 10/2005 | Liu et al. | |
| 2005/0238310 A1 | 10/2005 | Hoshi et al. | |
| 2006/0023997 A1* | 2/2006 | Almeida et al. | 385/27 |
| 2006/0222288 A1 | 10/2006 | Spoonhower et al. | |
| 2006/0227840 A1 | 10/2006 | Spoonhower et al. | |
| 2007/0009205 A1* | 1/2007 | Maleki et al. | 385/27 |
| 2007/0085100 A1 | 4/2007 | Diana et al. | |

OTHER PUBLICATIONS

Allen, L.; Eberly, J.H.; "Optical Resonance and Two-Level Atoms"; pp. 1-2; bearing dates of 1975, 1987; Dover edition, 1987—an unabridged and corrected edition of the work originally published in 1975 by John Wiley & Son, Inc., New York, as vol. XXVIII of their series "Interscience Monographs and Texts in Physics and Astronomy."

Barb, I; Gerritsma, R.; Xing, Y.T.; Goedkoop, J.B.; Spreeuw, R. J. C.; "Creating Ioffe-Pritchard micro-traps from permanent magnetic film with in-plane magnetization"; The European Physical Journal D; bearing dates of Jan. 14, 2005 and May 3, 2005; pp. 75-79; vol. 35; EDP Sciences; Society Italinana di Fisica, Springer-Verlag 2005.

Christandl, Katharina; Lafyatis, Gregory P.; Lee, Seung-Cheol; Lee, Jin-Fa; "1D and 2D optical lattices on a chip for quantum computing"; pp. 1-17; located at: http://arxiv.org/ftp/physics/papers/0401/0401041.pdf; printed on Oct. 26, 2005.

Čižmár, Tomáš; Garcés-Chávez, Veneranda; Dholakia, Kishan; Zemánek, Pavel; "Optical conveyor belt for delivery of submicron objects"; Applied Physics Letters; bearing dates of Feb. 15, 2005, Mar. 21, 2005, Apr. 21, 2005 and Jun. 14, 2005; pp. 174101-1-174101-3; vol. 86, No. 174101; American Institute of Physics 2005.

Matsko, A.B. et al.; "Review of Applications of Whispering-Gallery Mode Resonators in Photonics and Nonlinear Optics"; IPN Progress Report; dated Aug. 15, 2005; pp. 42-162; located at: http://ipnpr.jpl.nasa.gov/progress_report/42-162/162D.pdf.

Rothemund, Paul W.K.; "Folding DNA to Create Nanoscale Shapes and Patterns"; dated Mar. 16, 2006; pp. 297-302; vol. 440; Nature Publishing Group 2006.

Savchenkov, Anatoliy A. et al.; "White-Light Whispering Gallery Mode Resonators"; Optics Letters; dated 2006; pp. 92-94; vol. 31.

Vahala, Kerry J.; "Optical Microcavities"; Nature; dated Aug. 14, 2003; pp. 839-846; vol. 424; located at: http://www.nature.com/nature/journal/v424/n6950/abs/nature01939.html.

Wang, Chia-Jean; Lin, Lih Y.; Parviz, Babak A.; "Modeling and Fabrication of Sub-diffraction Nanophotonic Waveguides Constructed via DNA-directed Self-assembled Quantum Dots"; bearing a date of 2005; pp. 1-3 located at: http://www.ee.washington.edu/research/photonicslab/publications/CLEO2005-WangLinParviz.pdf; Optical Society of America.

Popa et al.; "Compact Dielectric Particles as a Building Block for Low-Loss Magnetic Metamaterials"; Physical Review Letters; bearing a date of May 23, 2008; pp. 207401-1-207401-4; vol. 100; The American Physical Society.

* cited by examiner

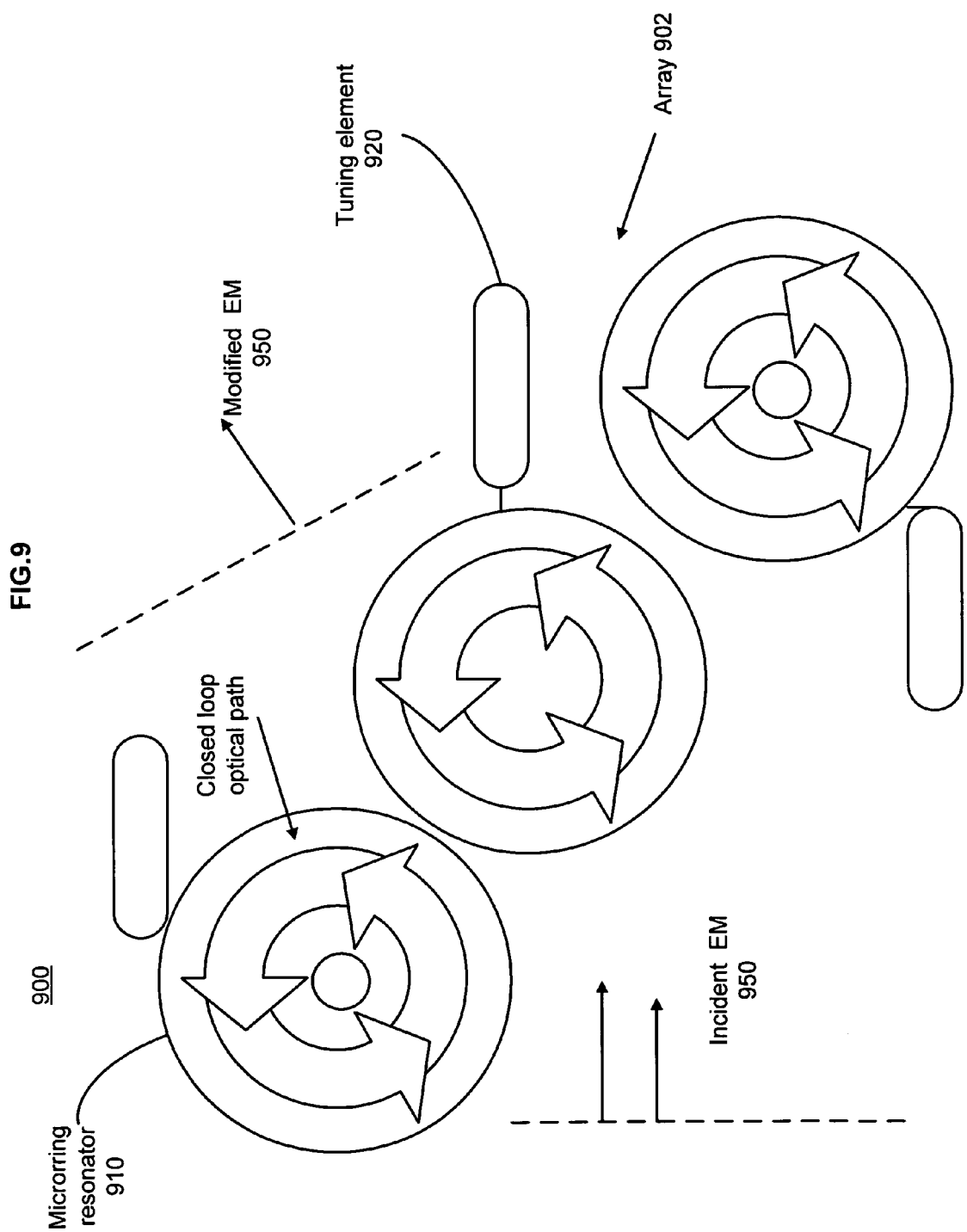

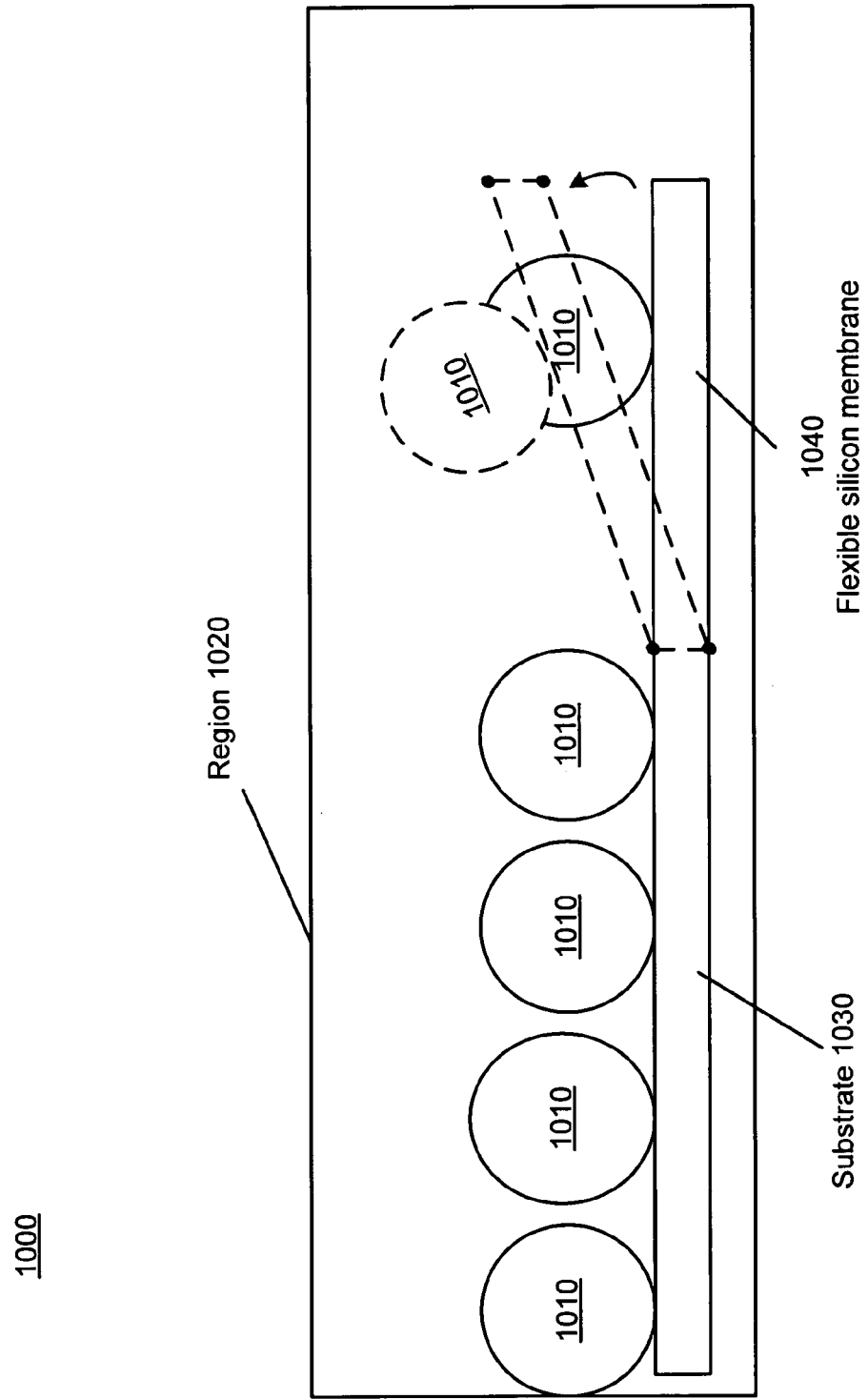

HIGH-Q RESONATORS ASSEMBLY

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

1. For purposes of the USPTO extra-statutory requirements, the present application constitutes a continuation-in-part of U.S. patent application Ser. No. 11/386,211, entitled ELECTROMAGNETICALLY RESPONSIVE ELEMENT WITH SELF RESONANT BODIES, naming W. Daniel Hillis, Roderick A. Hyde, Nathan P. Myhrvold, Clarence T. Tegreene, and Lowell L. Wood, Jr., as inventors, filed Mar. 22, 2006, which is currently co-pending, or is an application of which a currently co-pending application is entitled to the benefit of the filing date.

2. For purposes of the USPTO extra-statutory requirements, the present application constitutes a continuation-in-part of U.S. patent application Ser. No. 11/386,212, entitled CONTROLLABLE ELECTROMAGNETICALLY RESPONSIVE ASSEMBLY OF SELF RESONANT BODIES, naming W. Daniel Hillis, Roderick A. Hyde, Nathan P. Myhrvold, Clarence T. Tegreene, and Lowell L. Wood, Jr., as inventors, filed Mar. 22, 2006, which is currently co-pending, or is an application of which a currently co-pending application is entitled to the benefit of the filing date.

3. For purposes of the USPTO extra-statutory requirements, the present application constitutes a continuation-in-part of U.S. patent application Ser. No. 11/386,227, entitled LAYERED ELECTROMAGNETICALLY RESPONSIVE ASSEMBLY, naming W. Daniel Hillis, Roderick A. Hyde, Nathan P. Myhrvold, Clarence T. Tegreene, and Lowell L. Wood, Jr., as inventors, filed Mar. 22, 2006, which is currently co-pending, or is an application of which a currently co-pending application is entitled to the benefit of the filing date.

4. For purposes of the USPTO extra-statutory requirements, the present application constitutes a continuation-in-part of U.S. patent application Ser. No. 12/218,043, entitled HIGH-Q RESONATORS ASSEMBLY, naming W. Daniel Hillis, Roderick A. Hyde, Nathan P. Myhrvold, Clarence T. Tegreene, and Lowell L. Wood, Jr., as inventors, filed Jul. 9, 2008, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present applicant entity has provided above a specific reference to the application(s) from which priority is being claimed as recited by statute. Applicant entity understands that the statute is unambiguous in its specific reference language and does not require either a serial number or any characterization, such as "continuation" or "continuation-in-part," for claiming priority to U.S. patent applications. Notwithstanding the foregoing, applicant entity understands that the USPTO's computer programs have certain data entry requirements, and hence applicant entity is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present application relates, in general, to materials, methods and structures for interacting with electromagnetic fields.

BACKGROUND

Typical optical and similar systems often employ refraction to control the propagation or distribution of excitation energy. For example, FIG. 1 shows refraction of a ray of light 90 in the visible portion of the electromagnetic spectrum at a top interface 92 and bottom interface 94 between a material 96 having index of refraction n=1 and a material 98 having index of refraction n=1.5. Due to the difference in index of refraction between the two materials 96, 98, the ray of light 90 bends at the interfaces 96, 98 between the materials.

BRIEF DESCRIPTION OF THE FIGURES

FIG. 9 is a diagrammatic representation of an array of microring/microcavity resonators and associated tuning elements.

FIG. 10 is a diagrammatic representation of an array of closed-loop resonators disposed on a flexible substrate.

DETAILED DESCRIPTION

Figure 1:
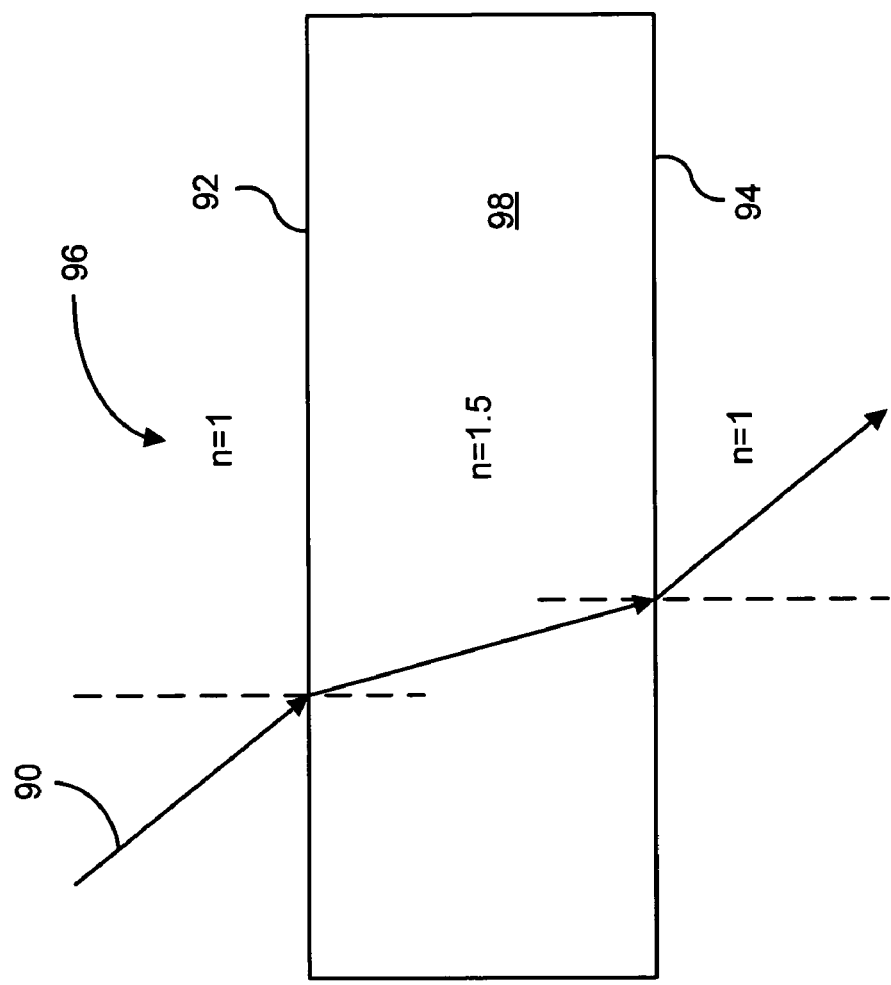
FIG. 1 is diagrammatic representation of refraction at boundaries.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The initial portion of this description relates primarily to the underlying physical rules and design parameters of systems, elements and apparatuses. The discussion herein will refer to optical effects and optical energy, as this is one range of interest and is a convenient reference for the underlying theory. Moreover, many of the atomic structures have natural frequencies in optical ranges. However, the analysis and illustrative embodiments herein are not necessarily limited to operation at visible, near visible or even optical frequencies. In some structures, such as manmade structures, the oscillators may operate at RF frequencies or even lower frequencies; and the action of oscillators is not limited to operation at or below frequencies traditionally considered to be optical frequencies. Moreover, much of the analysis herein can be extended to non-electromagnetic applications, including those involving phononic structures and designs.

Also, in this disclosure, the term "visible" light can relate to so-called "near-visible" light such as that in the near infrared, infra-red, far infrared and the near and far ultra-violet spectrums.

Figure 2:
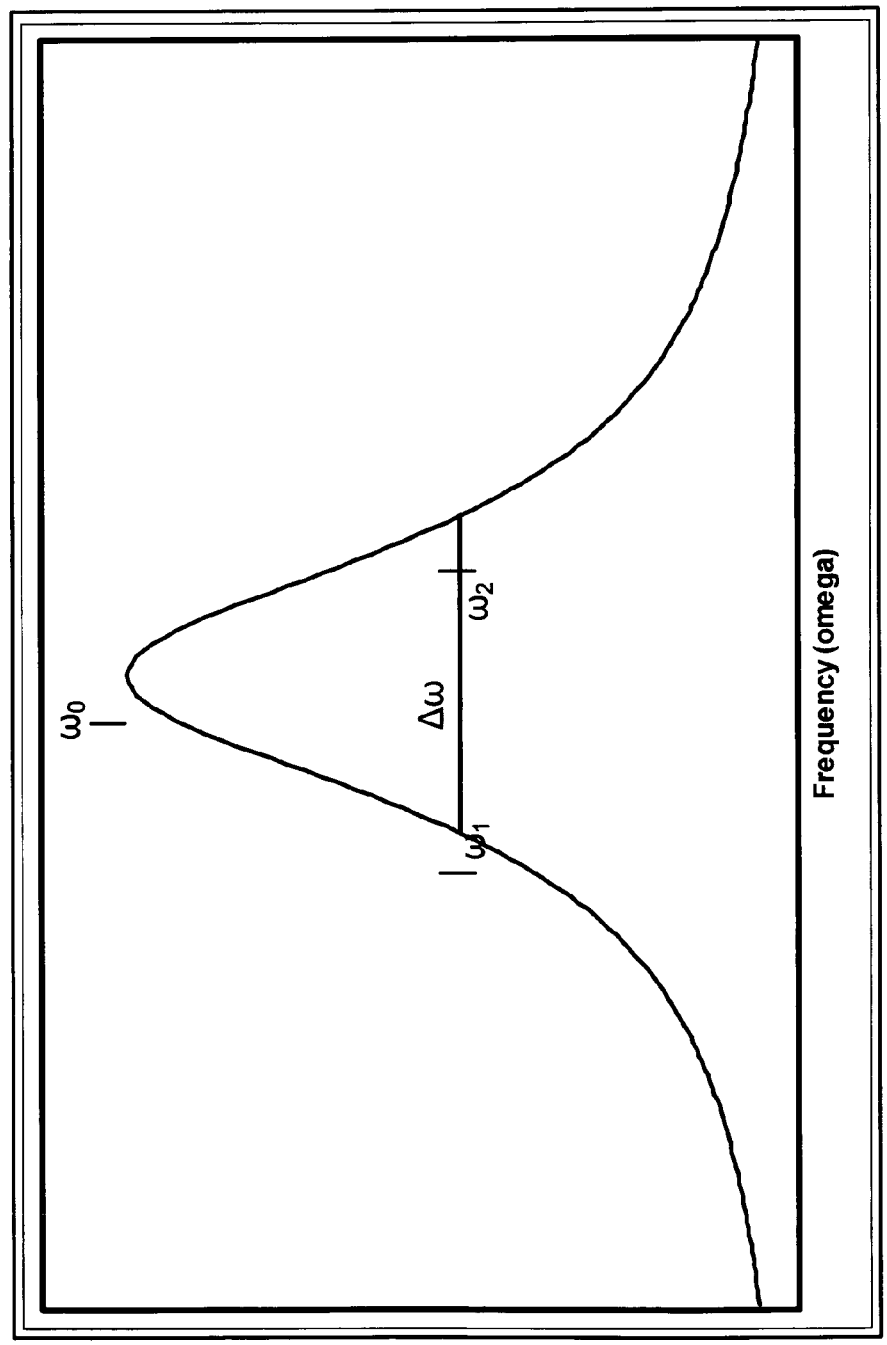
FIG. 2 is a representation of linewidth and frequency of an oscillator.

Turning to a general discussion of interactions and properties of various structures, with respect to interactions of atomic or discrete structures and electromagnetic energy, an atomic or other type of resonance, shown in FIG. 2, may be characterized by its quality factor (Q), where $$Q \sim \frac{\omega_0}{\Delta\omega},$$

where $\omega_0$ is the resonant frequency and $\Delta\omega$ is the half-width of the resonance, where the half-width is the width of the resonance at half of its maximum value. In many naturally occurring materials $\omega_0$ is within the optical range. In many materials, atomic structures have a relatively large half-width and therefore a low Q (e.g., in a range from about L-10), so the corresponding index of refraction is not highly wavelength dependent but tends to vary slowly with the wavelength of incoming radiation.

Some atomic structures and other self-resonant bodies have a larger Q (e.g., in a range from about 100 to 1,000) or other structures have a high Q (e.g., on the order of 1,000 to 10,000), including some with high Q in the visible part of the electromagnetic spectrum. In either the high Q, low Q or other cases, the atomic structures or other self resonant bodies can operate as oscillators that respond to selected resonant frequencies. The description herein will consider general cases of responses of oscillators, such as these self-resonant bodies.

For purposes of the following discussion, references will be made to classical, semiclassical, and quantum analyses, processes, theories, and other matters. As used herein, the context and analysis will typically indicate the mode of reference; however, the following is a simplified guide to the usage. Classical and semiclassical electromagnetic theory and quantum theory are commonly used generalized classifications of physics analysis and one of skill in the art will understand the following to be general categorizations and should not be considered limiting. In fact, in many cases, systems may be considered to be relevant to, or enveloped by one, two, or even all three of the categories, and thus the general categorizations should not be considered limiting.
Classical: Oscillators and fields are both classical
Semi-classical: Oscillators are quantum, but fields are still classical
Quantum: Oscillators and fields are both quantum
Oscillator Behavior In considering response of oscillators generally, it is useful to consider them from the viewpoint of classical and semi-classical theories, which for the purposes of the structures and methods described herein have significant similarities and parallels. In both cases the EM fields can be treated classically, and can take any magnitude.

Figure 3:
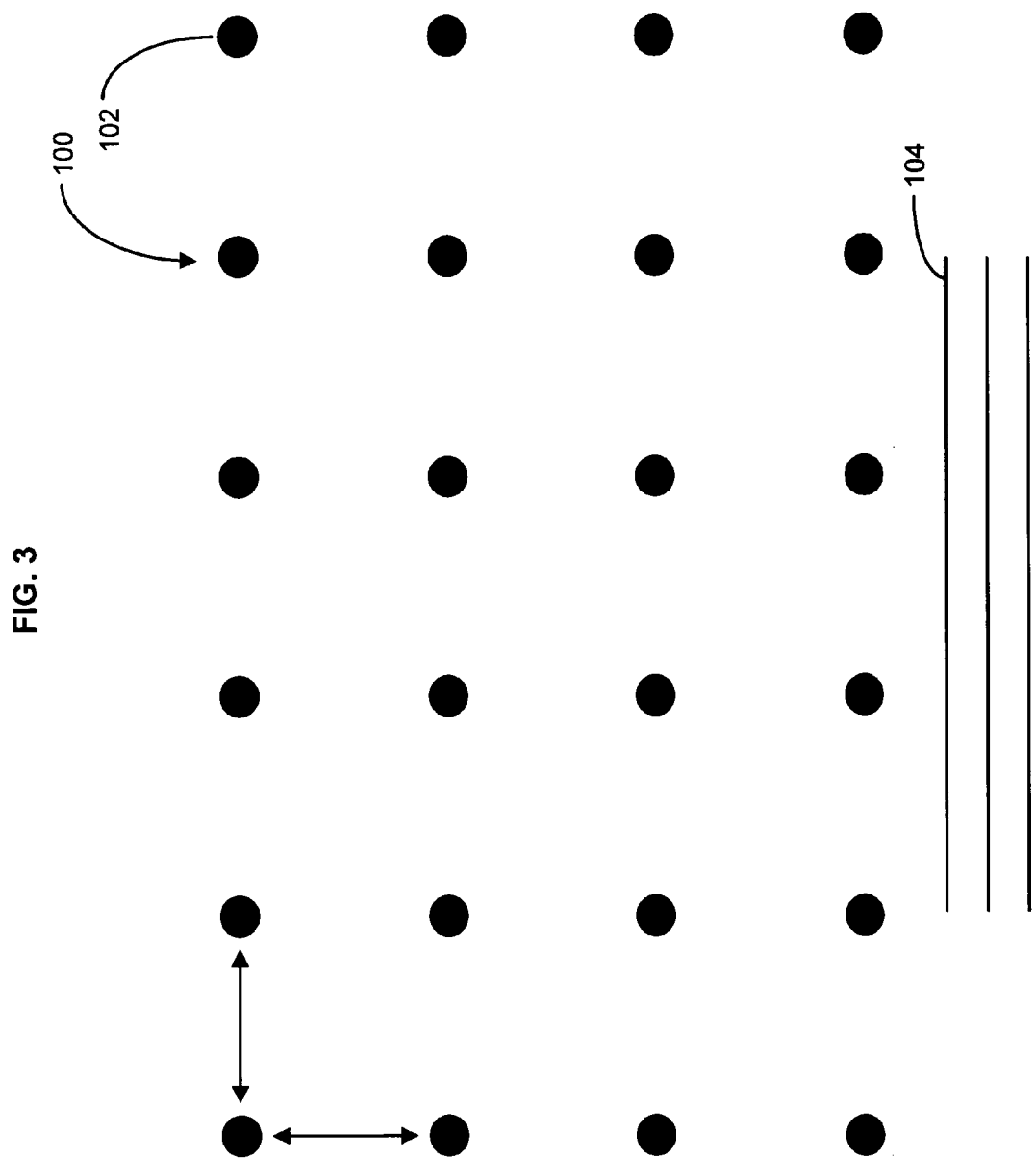
FIG. 3 is diagrammatic representation of an array of self-resonant bodies.

As shown in FIG. 3, an array 100 of oscillators 102 is distributed according to a selected pattern and receives an excitation input 104, represented in FIG. 3 as a single frequency optical wave. The structures, methods, analysis and other aspects described herein are not generally limited to excitation of a single frequency, an optical frequency, a single polarization, or even a coherent excitation. However, in some cases, excitations of a single frequency, sets of discrete frequencies, single polarizations, or other constraints may be considered for simplicity or clarity of presentation. Additionally, in some cases, the structures, methods, and approaches herein can be specifically tailored to address one or more specific frequencies or frequency bands selectively.

Also, while the illustrative representation of FIG. 3 shows the oscillators 102 arranged in a 2D lattice, a wide range of other arrangements, including 1D and 3D configurations may be implemented. Moreover, the various types of oscillators, patterns, and interactions between oscillators 102 will be described more fully herein. Initially, however, the operations, dynamics and response of individual oscillators are considered generally. Note that, although the description herein refers to the elements of the array as oscillators for clarity of presentation and consistency of terminology with respect to mathematical and theoretical references, a variety of structures may form the oscillators. In one illustrative embodiment, the oscillators may be self-resonant bodies, such as selected atoms, molecular structures, or quantum dots, though metamaterials, waveguides or other resonant structures may fall within the discussion herein. In one example, the oscillators 102 may be rare earth atoms having very high quality factors (Qs), although as described herein, oscillators having lower Q can still operate as a group, or even individually in some configurations.

The following section of this description will use real variables, and assume a field of $$E(r,t)=F\cos(\omega t - k \cdot r)$$

for the excitation input 104, where F is considered to be a constant or a slowly varying (compared to $\omega$ and k) function of space and time, rather than a pure constant for this discussion, though F is not necessarily so limited in all cases. In the oscillators 102, the field E(r,t) induces dipole moments, p. The dipole moments p create a global polarization, P, of the array 100 that changes E(r,t).

On the individual oscillator level, the dipole moment p has two parts, u which is in phase with E(r,t) and v which is out of phase with E(r,t):

$$p(r,t)=d\{u\cos(\omega t - k \cdot r) - v\sin(\omega t - k \cdot r)\}$$

As will be discussed below, u will typically lead to a refractive or similar response and v will typically lead to absorption or gain. For directness of presentation, u and v are treated as dimensionless variables and constants for purposes of the initial discussion below. However, u and v are not necessarily constants, and often may vary slowly relative to $\omega$ and k with space and time. The terms u and v will also vary due to the influence of E(r,t).

For a classical oscillator, no limit is placed on dipole size and d is a characteristic value. For comparison purposes, it is useful to note that in a quantum analysis, a two level oscillator is considered to have a dipole size limit, where d is the maximum size of the dipole moment.

For the entire array 100 or a section of the array 100 the oscillators 102 have a density N(r) from which the group polarization can be represented in a simplified fashion as:

$$P=Np$$

In some cases, P represents the group polarization sufficiently well. However, where the oscillators are not identical, a more complex representation of P may be used. For example, where the oscillators 102 have different line-centers, P can be determined as an integral over the various p values:

$$P=N\int p(\Delta)g(\Delta)d\Delta$$

where the oscillators' line-centers are distributed over a range with their offset from the excitation frequency described by an offset $\Delta$ with a distribution $g(\Delta)$.

Note that the above considers the basic case of simple oscillators, having no preferred or constrained directional responses with p and P aligned with E, and the medium being isotropic, for simplicity and clarity of presentation. But it will be understood that there are some cases such as oriented systems that may include such constraints or configurations. Illustrative examples of systems that may differ from the isotropic may include atomic oscillators with magnetically biased $\Delta_m$ transitions, artificial nano-oscillators, or similar. In such cases, the analysis can treat p, P, and E more completely using vector representations and corresponding matrix analysis, rather than the scalar equations presented in this illustrative example.

The interaction of the oscillators with an excitation frequency can be represented according to classical theory using Maxwell's equations, to provide that $$D=E+4\pi P$$

From a knowledge of E and P, one can calculate the permittivity $\in$, and then combine this with the magnetic permeability $\mu$, to get the index of refraction, n. For isotropic systems $$\in = D/E = 1+4\pi P/E$$

$$n=\sqrt{\in\mu}$$

For classical fields, this allows straightforward calculation of the effects of the oscillators 102 on the excitation input. The relationship between the effective refractive index and the oscillator properties allows the response of selected distributions to be determined. Moreover, the index profile can be selected according to a desired optical response, taking into account the design considerations relating to frequency response, controllability, spatial distribution, polarizability and other features of the oscillators. In one simple illustrative example, the oscillators can be selected and positioned to approximate one or more spherical or hemispherical lenses. Moreover, gradient effective refractive indexes may follow linear, parabolic, Gaussian or other profiles. Additionally, the peak effective refractive index may be at a location other than a central axis. For example, in a structure that operates as a negative lens, the minimum effective refractive index may be along a central axis. Further, while these are examples of structures that tend to be symmetric about one or more axes, structures having refractive index asymmetry may also be appropriate in some applications as may be periodic or aperiodic patterns of effective refractive index. The following present some examples of such calculations for illustrative cases of oscillator coupling, properties, arrangements, or other oscillator properties.

Behavior of the Oscillators

Typically, u and v are proportional to E, and u is responsible for the real part of the index of refraction, while v leads to the imaginary part, and hence absorption or gain. At one extreme, u and v of the oscillators 102 are entirely predetermined, and are independent of E. In such a case, the group polarization P becomes simply a source term in Maxwell's equations and the oscillators can be considered as transmitters. The oscillators 102 can be positioned spatially according to a desired response to the excitation input 104 to produce output pattern within the frequency responses of the oscillators according to conventional Maxwellian propagation.

While various illustrative structures and spatial positioning arrangements will be described in more detail elsewhere herein, such spatial arrangements can vary widely in analogs to conventional optical or microwave elements. For example, spatial arrangements can approximate a gradient index to form a guiding or lensing structure similar to gradient index optics. Similarly, responses similar to Fresnel plates or lenses, refractive boundaries, stacked optical or microwave trains or other selected responses may be implemented. Moreover, the arrangements may be selected to produce responses different from conventional optical or microwave structures. For example, narrowband, thin lenses are described herein.

Returning to discussion of behavior of oscillators, at an opposite extreme, the oscillators 102 are free-running, and driven solely by E. In such a case, the spatial distribution and oscillator properties define the response to the input signal E. While the above represent the pure cases, hybrids can also be implemented.

Classical Oscillators

Considering the oscillators 102 first as classical, free-running oscillators, the motion of a charge in a classical oscillator is given by:

$$\ddot{x}+\frac{2}{\tau}\dot{x}+\omega_0^2 x = \frac{e}{m}E$$

where $\omega_0$ is the excitation frequency and $1/\tau$ is the decay rate. The decay rate $1/\tau$ combines radiative and collisional parts:

$$\frac{1}{\tau}=\frac{e^2\omega_0^2}{3mc^3}+\frac{1}{\tau_c}$$

In the limit where $\omega\approx\omega_0$, so that $\Delta=\omega_0-\omega$ is $\ll\omega$, and where $\omega\tau\gg 1$, the two dipole terms, u and v can be represented by coupled linear equations:

$$\dot{u}=-\Delta v-\frac{u}{\tau}$$

$$\dot{v}=\Delta u-\frac{v}{\tau}-\kappa F$$

where κ is the field coupling coefficient, $$\kappa = \frac{e^2}{2mcd}.$$

The steady-state solutions become:

$$u = \kappa\tau F \frac{\Delta\tau}{1+\Delta^2\tau^2}$$

$$v = -\kappa\tau F \frac{1}{1+\Delta^2\tau^2}$$

These steady state representations lead to classical expressions for permittivity and absorption. For the simple case of a number density N of a single type of oscillator with a single line-center frequency, permittivity components can be represented as $\epsilon = \epsilon_1 - i\epsilon_2$ $\epsilon_1 = 1 + 4\pi N du$ $\epsilon_2 = 4\pi N dv$ Thus, for a classical oscillator, the index of refraction, $n = \sqrt{\epsilon\mu}$, can be controlled by controlling the density of oscillators, N, locally and/or broadly.

In one example, spatially varying the population density N of the oscillators 102 can produce a defined index profile at and around the center frequency $\omega_0$. In one approach, a gradient or other variation can produce a lens at and around the line center. The specific spatial distribution of densities can be determined based upon the intended response using the permittivity defined herein as a component of the optical or RF design.

Where the excitation input 104 is substantially centered on the resonant frequency of the oscillators, the refractive and/or absorptive response can be very large. Note that such responses may also be very frequency specific, depending upon the resonant bandwidth (corresponding to Q) of the individual oscillators 102 and the number of oscillators 102 sharing common resonant frequencies.

It can also be noted that, where the resonant frequency of a subset of the oscillators 102 differs from that of another subset, the subsets can be substantially independent. That is, each can be responsive to its respective resonant frequency and nonresponsive to the resonant frequency of the other subset. The degree to which the respective subsets are independent can be defined in part by the relative separation of the respective resonant frequencies, the respective resonant bandwidths of the oscillators, and group effects as will be described below. Such independence may be useful to selectively respond to excitation inputs of different colors (e.g., RGB) or different wavelengths within what can be considered a single color (e.g., different wavelengths of red). Moreover, such independence may arise within a common plane through intermingling of oscillators of different $\omega_0$, through layering, or both.

Note that in the previous examples, each of the oscillators 102 was considered to be active and responsive to the input excitation 104 for straightforward presentation. Note that such a condition is not always the case and, in fact, as shown by later examples herein, this condition can be influenced or dictated as part of the design considerations or implementation.

The previous discussion also did not directly address inter-oscillator coupling, although such coupling can be incorporated into the permittivity and absorption calculations.

It can be noted that absorption is highest on-resonance and drops-off as a function of $\Delta^2$ for this analysis. That is, the absorption drops off as the square of the difference between the excitation input 104 and the resonance frequency $\omega_0$ of the oscillator. It can also be noted that refraction peaks slightly off-resonance, drops more gradually away from resonance, and has opposite signs depending upon whether the excitation frequency is above or below the resonance frequency. Operation at frequencies above the resonant frequency ($\omega > \omega_0$) can produce negative index structures.

Quantum Mechanical Oscillators

Many natural oscillators, such as atomic oscillators, can typically be described more effectively by quantum mechanics. This arises, in part, because such oscillators have discrete eigenstates, and fields excite transitions between these distinct states, rather than across a continuum. While real atoms and quantum oscillators have a multiplicity of eigenstates, typical analysis concentrates on only two at a time to simplify the presentation and physical understanding. The approximation is adequate in most cases because, for relatively narrow line-width, near-resonance interactions (those where the oscillators 102 have the strongest effect), there is usually only one transition close enough to strongly interact.

The response of the array of oscillators 102 can be further refined by considering the impact of impinging electromagnetic energy on the quantum states of the oscillators 102. In some cases, energy from incident electromagnetic waves can be absorbed by the oscillators 102 and can impact or substantially govern their quantum states. The above analysis can be refined to determine responses that accommodate or even make use of the responsiveness of the quantum states. In one approach, described herein, a state energy input, which may be a part of the incident excitation energy 104 or a separately supplied input, can permit active control of the oscillator properties, and thereby impact optical or RF response.

Figure 4:
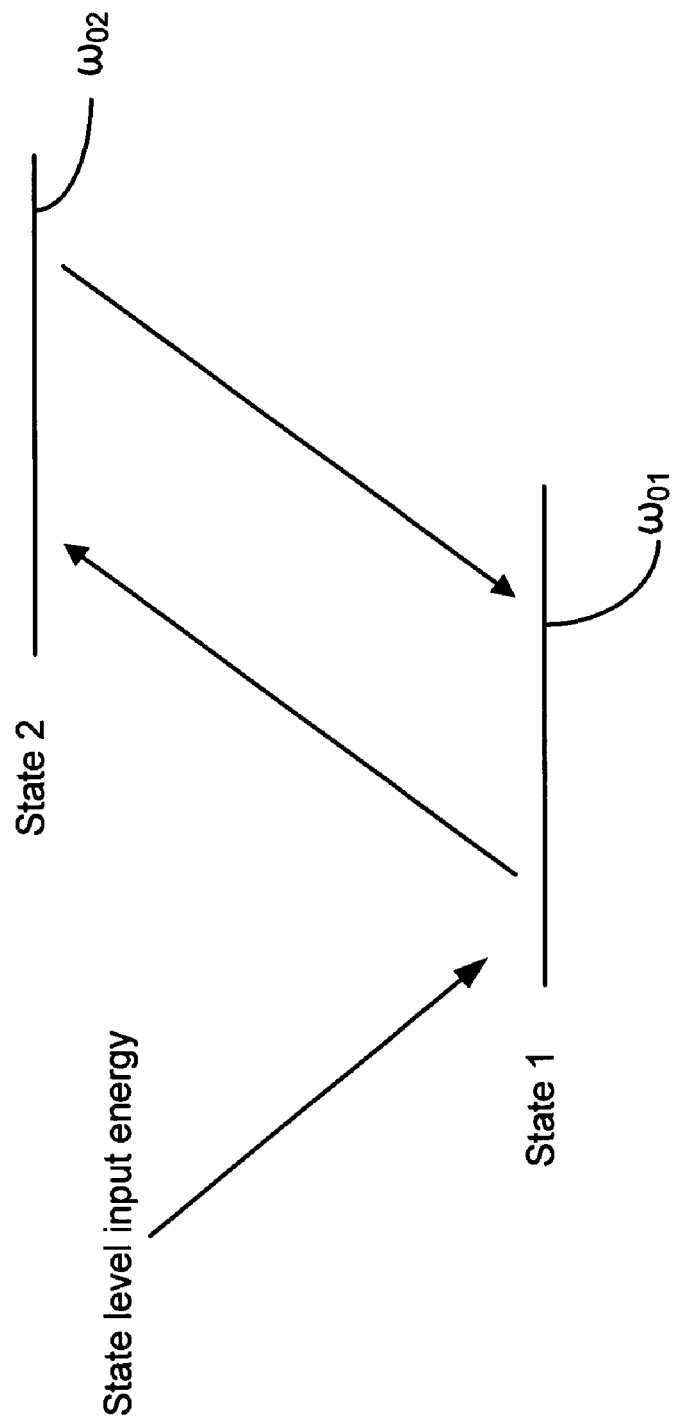
FIG. 4 is diagrammatic representation of quantum levels of a self-resonant body.

As an illustrative example of influencing quantum states and thus impacting the oscillator properties, a two level oscillator is presented in FIG. 4. While oscillators having two, three, four, or even more quantum states can be considered, the two state case is presented here for directness and clarity of presentation.

As an initial illustration, the excitation input and the state level input will be considered to be the same input to ease presentation of quantum state impacts and to ease understanding of how the characteristics of the excitation input can impact the response of the optical array 104. As noted previously, as the oscillators absorb energy from the excitation input (or other state energy input), some of the oscillators move to an upper quantum state. This depletes the lower state, thereby reducing the material's polarization and thus the effective refractive index, thereby lessening optical strength. As the lower state is repopulated both by decay (radiative or parasitic) and by stimulated emission, the optical strength can recover, in part. The relative rates of depletion and repopulation, as well as the optical response will depend in part upon the level of coherence of the excitation input and the state level input.

Incoherent Illumination:

The effect of incoherent excitation energy, such as incoherent light, can be tracked by rate equations based on the Einstein A and B coefficients.

Up-rate = $BIN_L$

Down-rate = $AN_U + BIN_U$

Starting with all oscillators in the lower state, with no separate state level input, such as pumping, the population does not fully invert and the steady-state solution is given by the $$N_L - N_U = \frac{I_\bullet}{I_\bullet + 2I} N$$

where the $I_\bullet$ spectral density (W/cm²/Hz) is given by the A/B ratio.

$$I_\bullet = \frac{A}{B} = \frac{8\pi h v}{\lambda^2}$$

The amount of flux that will produce a given change in the oscillator populations depends in large part on the bandwidth of the oscillator, since flux is a function of the density $I_\bullet$ times the oscillator linewidth. Considering the simple case where oscillators have substantially identical line centers, the excitation input is typically a narrow linewidth source, since inputs outside of the oscillator response bands will usually have little effect. A narrow source will saturate at intensities of:

$$J_\bullet = I_\bullet \Delta v = \frac{8\pi h v}{\lambda^2 \tau}$$

As an example of the flux for long-lived oscillators using 0.5 µm light, the saturation spectral density is 4 nW/cm²/Hz. According, for oscillator lifetimes of 1 ms this provides a 1000 Hz band, that saturates at a flux of about 4 µW/cm². Comparatively, for broadband light sources (e.g., typical natural light), the spectral density is about $10^{-16}$ W/cm²/Hz, and would have negligible effect on oscillator populations. Thus, at most reasonable ranges of excitation energy, broadband or natural light at typical levels has little effect on optical strength. Thus, in this illustrative case, optically induced changes in optical strength can be controlled with on- or near-resonance, narrow-band, light, and will not be significantly affected by broadband background light.

Similarly, because oscillators respond strongly to excitation inputs at or near resonance and will typically respond weakly or negligibly to excitation inputs at other frequencies, the optical strength will be spectrally selective. As will be discussed below, in many configurations, the spectrally selective nature of the oscillators can produce single or near-single wavelength optics. This does not necessarily limit responses to a single, narrow response band. Instead, in some cases excitation inputs can interact with more than one array of oscillators, and oscillators in different arrays may have different center frequencies and/or linewidths. Thus, the different arrays can interact with excitation energies at more than one center frequency. Moreover, because the oscillators having different line centers can be spatially proximate while retaining independence of response, the different arrays can be overlapped and can even occupy common planes or volumes in space.

Coherent Illumination:

While the above consideration of non-coherent illumination can produce a variety of structures that interact selectively with excitation energies, additional aspects may utilize very narrowband sources, such as lasers. While much of the above analysis can be applied directly to coherent illumination and interactions, other aspects and embodiments may consider coherent interactions between the oscillators' upper and lower states. Treatment of resonance of Two-Level Atoms can be found in Allen and Eberly, "Optical Resonance and Two-Level Atoms," Dover Publications, Inc., (1975). However, as noted previously response to excitation inputs can be considered for cases including oscillators having three or more levels, as well.

Coherent coupling between classical radiation and the quantum states of a two-level quantum oscillator can be described by the oscillator's eigenstates $|\psi_-\rangle$ and $|\psi_+\rangle$, and by the 3 variable Optical Bloch equations. The first two variables, u and v, are very closely related to the classical counterparts described previously. In the quantum representation, u describes the real part of the dipole transition element $\langle \psi_+^* |x| \psi_- \rangle$, while v describes the imaginary part. A third variable, w, describes the amount of mixing between the upper and lower eigenstates (in effect the degree of population inversion); w is −1 for the lower state and +1 for the upper one.

The evolution of the 3 Bloch variables u, v, and w is given by $$\dot{u} = -\Delta v - \frac{u}{\tau_2}$$

$$\dot{v} = \Delta u - \frac{v}{\tau_2} + \kappa F w$$

$$\dot{w} = -\kappa F v - \frac{w - w_\bullet}{\tau_1}$$

where K=4d/h.

The first two of the above Bloch equations representing the dipole variables are quite similar to the classical representation of the dipole variables. However, the quantum representation is modified by multiplying the field containing factor by the population-level variable, w. The third equation, for w, has a drive term due to field coupling with the out-of-phase part of the dipole, and relaxes towards an equilibrium level, $w_\bullet$, which reflects external drive or decay mechanisms.

Despite the similarities with classical oscillators, the Bloch equations for quantum mechanical oscillators do indicate behavioral differences. This can be illustrated by considering the slow-decay (or short-pulse) limit, where $\tau_1$ and $\tau_2 \to \infty$. Here the system is conservative:

$$u^2 + v^2 + w^2 = 1$$

It can be seen from this that the dipole moments are not only limited, but are strongest when the oscillators are half-flipped (e.g., w~0); when oscillators are near the ground state or the upper state (e.g., w~−1 or 1), they have weak dipole strength.

The Bloch equations are nonlinear, so typically are solved numerically, particularly in cases where the excitation energy self-consistently couples to the field via the global polarization P according to Maxwell's equations. Such numerical solutions can be implemented according to conventional software approaches, including iterative approaches.

In some specific cases, an analytical solution can be more appropriate and can provide useful information. A first example is a steady state solution, corresponding to that for the classical oscillator case. In such a situation the dipole variables can be represented according to:

$$u = -\kappa \tau_2 F w_\bullet \frac{\Delta \tau_2}{1 + \Delta^2 \tau_2^2 + \kappa^2 F^2 \tau_1 \tau_2}$$

-continued $$v = \kappa\tau_2 Fw_\bullet \frac{1}{1+\Delta^2\tau_2^2+\kappa^2 F^2\tau_1\tau_2}$$

$$w = w_\bullet \frac{1+\Delta^2\tau_2^2}{1+\Delta^2\tau_2^2+\kappa^2 F^2\tau_1\tau_2}$$

It can be noted from these representations that, while classical oscillators have ever-increasing dipole strengths in high fields, dipole moment for quantum oscillators can actually decrease in very strong fields. As noted for the classical case, when the excitation frequency $\omega$ is greater than the resonant frequency $\omega_0$, the effective index can be negative.

A second example case is the Rabi solution, which occurs in the slow-decay limit, such that $\tau_1$ and $\tau_2 \to \infty$, and where the field, F is constant. Representing $\kappa F$ as a frequency, $\Gamma$, and defining a Rabi precession frequency, $\Omega$:

$$\Omega = \sqrt{\Delta^2 + \Gamma^2}$$

the Rabi solution features oscillating u, v, w values:

$$\begin{Bmatrix} u \\ v \\ w \end{Bmatrix} = \begin{Bmatrix} \frac{\Gamma^2 + \Delta^2 \cos\Omega t}{\Omega^2} & -\frac{\Delta}{\Omega}\sin\Omega t & -\frac{\Gamma\Delta}{\Omega^2}(1-\cos\Omega t) \\ \frac{\Delta}{\Omega}\sin\Omega t & \cos\Omega t & \frac{\Gamma}{\Omega}\sin\Omega t \\ -\frac{\Gamma\Delta}{\Omega^2}(1-\cos\Omega t) & -\frac{\Gamma}{\Omega}\sin\Omega t & \frac{\Delta^2 + \Gamma^2 \cos\Omega t}{\Omega^2} \end{Bmatrix} \begin{Bmatrix} u_0 \\ v_0 \\ w_0 \end{Bmatrix}$$

Considering the case where an oscillator starts in the ground state ($u_0$ and $v_0=0$, $w_0=-1$), the oscillator begins as inert, and with no dipole strength. Upon exposure to a field, $\Gamma \neq 0$, its u, v, w state starts changing cyclically at the Rabi frequency $\Omega$. The dipole moment, u and v, depends on the field strength, but is only directly proportional to the field strength F in the low field limit where $\Gamma \ll \Delta$. Even in this case, u/F and v/F cyclically change size, with v repetitively changing sign (leading to bouts of gain and loss).

Accordingly, when decay is weak (or pulses are short), the response of the array 100 of oscillators 102 is typically considered dynamic, not static. Viewed over many cycles, the oscillators 102 have a net effect of $$\begin{Bmatrix} u \\ v \\ w \end{Bmatrix} = \begin{Bmatrix} \frac{\Gamma^2}{\Omega^2} & 0 & -\frac{\Gamma\Delta}{\Omega^2} \\ 0 & 0 & 0 \\ -\frac{\Gamma\Delta}{\Omega^2} & 0 & \frac{\Delta^2}{\Omega^2} \end{Bmatrix} \begin{Bmatrix} u_0 \\ v_0 \\ w_0 \end{Bmatrix}$$

In this limit, the array 100 of oscillators 102 has no net gain-or-loss. However, the oscillators do induce phase delays and thus have an effective net refraction. As noted for the previous case, when $u_0=0$ and $w_0=-1$, the refraction can be made negative by exciting above the resonance frequency of the oscillators 102.

In the case where the excitation input 104 is a narrowband signal, the refractive response and absorption response of the oscillators 102 can be determined from the above representations.

In addition to the cases of coherent excitation just described, coherence can be implemented spatially by arranging the oscillators into a spatially prescribed pattern. While this is not strictly a quantum effect, the farfield response to coherent illumination can be determined according to classical far field determinations of coherently emitting sources or coherently addressed receivers. Such techniques for determining farfield response are sometimes used in determining the response of phased array antennas or diffractive optical components.

Since many light sources have sufficient coherence over at least a subset of expected lens dimensions, such determinations of the coherent response of a pattern of coherent emitters or detectors can indicate the response of an array of oscillators where the oscillators are positioned according to a selected spatial pattern.

Where each of the oscillators is positioned sufficiently closely to other oscillators in the array, inter-oscillator coupling can occur. In one configuration, the oscillators are spaced closely enough to be within each other's near field. Where the inter-oscillator coupling is sufficient for a given Q and line center, the oscillators' group behavior can cause the oscillators to synchronize. In an extreme case, the oscillators act as a group having an extremely high polarization P. Such behavior is indicative of Dicke superradiance.

Even where the oscillators do not reach the limits of Dicke superradiance, their operation may be synchronous. In one approach, synchronization occurs as a result of inter-oscillator coupling. However, synchronization can result from other conditions, including those provided as part of the system or apparatus design. For example, each of the oscillators can receive energy (excitation energy, state level energy, a separate electrical or EM signal or a variety of other energy sources) according to a selected relative timing or phase. In one example, electronic circuitry provides a respective pulse train or sine wave to each of the oscillators with each pulse train or sine wave having a selected relative phase. In a very simple case, the relative phase may be zero. The pulse train or sine wave then provides a base signal that helps synchronize the relative phases of the oscillators in the array 104.

In addition to or separately from controlling the relative phases, the state level energy or another energy source can control the degree to which the oscillators are saturated. For example, an off-axis coherent signal directed toward selected ones or sets of oscillators can shift the quantum state upwardly toward or substantially the way to inversion. In some cases, as the state shifts away from the middle state, the effective index will fall, as described previously, thereby reducing the optical strength. In this approach, electronic circuitry controls flux level of the off-axis energy, and in turn controls the optical strength of the array. The electronic circuitry thus allows control of the response of the array. The electronic circuitry can use this effect to refine the response of the array to accommodate imperfections or to selectively control the response of all or a portion of the array.

Note that while the energy source in the illustrative example was off-axis light, other types of energy, such as energy off of line center can also provide control of the inversion level. Moreover, the previous discussion has concentrated primarily on the strength of interaction from the point of view of deflection (refraction or reflection) or other aspects of control of the direction of propagation of the excitation energy. However, the inversion level can also affect the non-real part of the response and thus affect absorption.

The previous discussion has concentrated primarily on oscillators acting as a group of elements responding to electromagnetic energy, rather than focusing on transverse coupling among sets of elements. However, in some cases, it may be appropriate to consider transverse coupling between the elements. In some configurations, such consideration may address near field coupling between adjacent or nearby elements.

In one approach to design that considers near field or similar coupling, adjacent oscillators are within or substantially within each other's near field, typically with spacing on the order of or less than a wavelength. In this case, oscillators in a local region experience essentially the same far field, but each sees a near field influenced or, in many cases, dominated by effects of closest neighbors. If the elements are placed in a periodic array, this neighbor-neighbor interaction will be reinforced for fields with wavevectors comparable to the inverse lattice spacing.

Where the spacing is less than a wavelength, these reinforced modes are near field, evanescent waves, in most cases. This periodically-reinforced interaction will act to modify the frequency response of the oscillators, and can cause a broadening of their resonant linewidth.

The magnitude of this broadening depends, in part, upon the oscillator-oscillator interaction strength and spacing. The interaction between two oscillators generally increases as their separation distance decreases. At some separation distance an interaction length can be defined within which mutual interaction between nearby oscillators becomes strong enough to significantly modify their oscillatory behavior.

If oscillators are placed in a periodic lattice or another structure having a degree of periodicity, with spacing smaller than or comparable to this interaction length, then near field periodic reinforcement can cause substantial broadening of the frequency response of the lattice relative to the expected frequency response in the absence of the reinforced evanescent modes. This broadening can establish a response of the periodic or partially periodic arrangement of oscillators to respond more evenly over a range of wavelengths. Such broadened response can reduce sensitivity to wavelength shifts of a light source or response to frequencies near to but different from the oscillators' natural frequency.

In other situations, these near field periodic broadening effects can be reduced by establishing the oscillator spacing and periodicity to minimize reinforcement of the broadening effects. In one approach, the interaction length or the oscillator spacing is established such that the interaction length is significantly smaller than the lattice spacing. In this situation, periodic reinforcement only occurs for large, multi-lattice-sized, wavevectors. Consequently, inter-oscillator interactions correspond to high harmonics of the lattice. Because such high-harmonic effects are significant only for highly regular, near-perfect lattices, naturally occurring or selectively induced irregularities in the oscillator lattice will minimize near field periodic broadening effects.

Narrow-Band, Near-Monochromatic, Response

Figure 5:
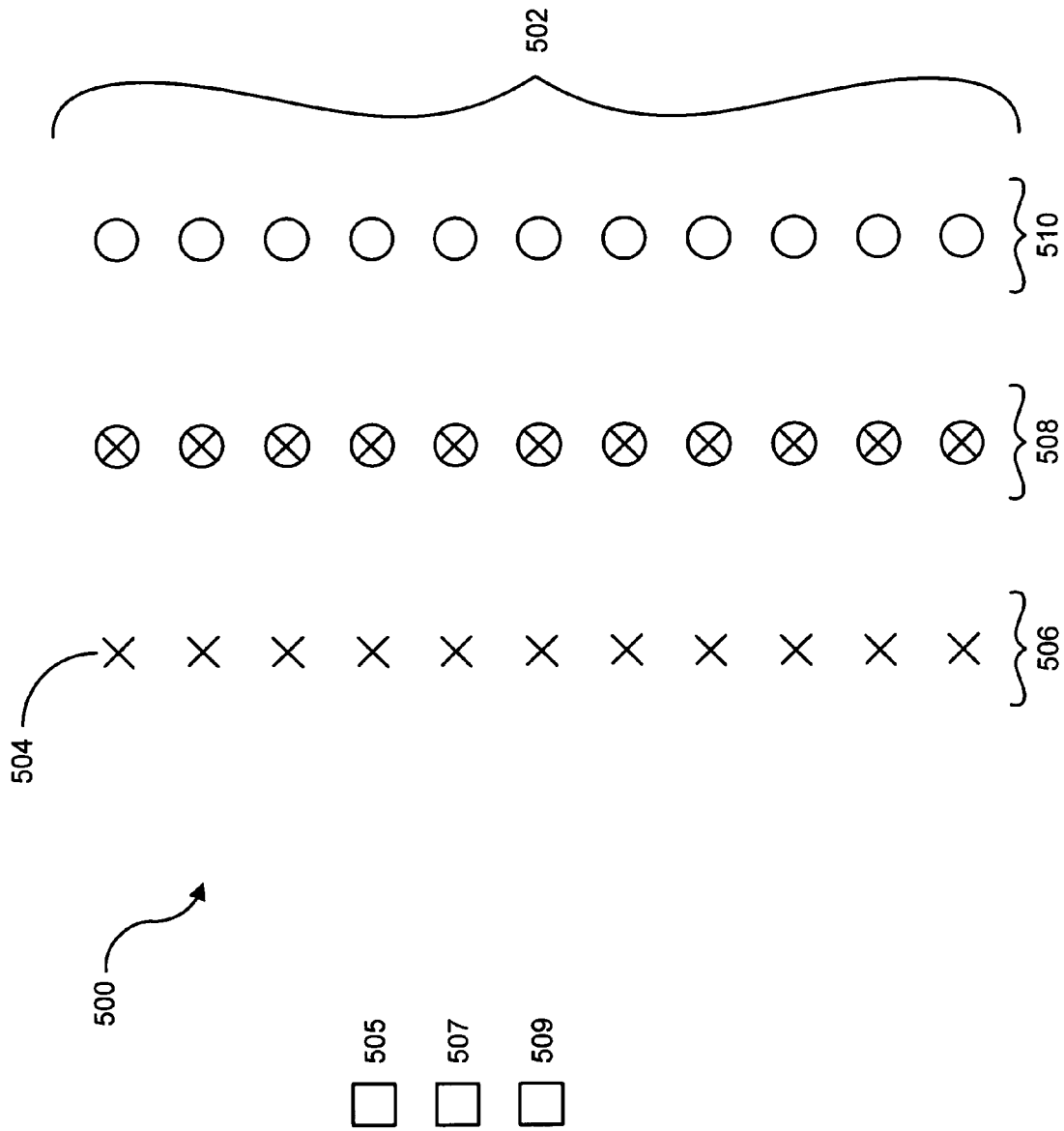
FIG. 5 is diagrammatic representation of a series of layers of optical element arrays.

As noted previously, where the oscillators are narrow linewidth oscillators, the optical or RF response can be wavelength-specific. In one embodiment presented in FIG. 5, an optical element 500 includes an array 502 of oscillators 504. For a first subset 506 of the oscillators, the center wavelength of the oscillators is matched to a wavelength of a first excitation source 505. For a second subset 508 of the oscillators, the center wavelength of the oscillators is matched to a wavelength of a second excitation source 507. Similarly, a third subset 510 of the oscillators, has a center wavelength of the oscillators matched to a wavelength of a third excitation source 509. In one approach, the wavelengths of the first, second and third excitation sources are within the range of human vision. The wavelengths may be in the red, green, and blue regions of the spectrum. As is known, red, green and blue wavelengths can be combined to produce a perceived range of wavelengths that substantially spans the human visual range.

Thus, in one application, the optical element can be applied to controlling optical energy in the human visual range. Such elements may form lenses or other elements of optical trains in cameras, displays, machine vision systems, printers, or other systems.

Note that each of the subsets may be patterned or otherwise configured to have the same, similar, or different characteristics from the others in their respective wavelength bands. For example, the red subset may have a different focal length from the blue subset. Such differentiation may be useful for example in discriminating elements at different distances. For example, in aircraft or automobiles, relatively nearby heads up display elements in the red wavelength band may remain in focus while relatively far away green elements may also be in focus. Similarly, such optical elements can compensate for achromaticities in conventional refractive optical trains.

While the array 502 is presented as a periodic, rectilinear array of individual oscillators 504, other arrangements and groupings may be implemented. For example, the oscillator can be packed more densely in a central region of the array 502 or individual oscillators can be replaced by groups of oscillators with increasing numbers of oscillators in each group toward the center of the array 502 to approximate a gradient index structure, thus forming a lens.

More generally, the relative index of local regions of the array 502 can be defined according to the approaches herein to define a variety of structures with optical properties defined at least in part by the relative refractive indexes. Such structures can be implemented for respective wavelengths using techniques applicable to conventional ray tracing or other design techniques for refractive optics. For example, the refractive index profile can be determined or evaluated using conventional tools such as Zemax Software (available from Zemax Development Corporation, 3001 112th Avenue NE, Suite 202, Bellevue, Wash. 98004-8017 USA) or similar design modeling, or analysis software.

Continuous Wave Operation

In some applications, optical elements formed by the arrays 104 may interact with pulsed excitation energies and in some applications the optical elements may interact with continuous wave excitation energies. Additionally, in some cases, the excitation energy may be some combination of discontinuous and continuous excitation or some approximation of one or the other or both.

A first illustrative case arises when the excitation energy is continuous or approximates continuous excitation. In cases where the excitation energy is applied over time scales □ greater than the decay times $□_1$ and □□ of the oscillators, the oscillators can feature the steady-state u and v values described previously. Accordingly the oscillators have large gain/loss coefficients near line-center. Accordingly, refractive effects depend upon the intensity of the excitation energy. In some cases, these large gain/loss values may be incorporated into the design. For example, as described previously, providing additional energy in the state level input can provide control of refractive effects.

In other applications, the frequency of the excitation energy can be selected to be sufficiently far from line center such that □□□≫1. This choice makes the optics refraction-dominated, but does result in a loss of optical power. In some cases, lower optical power operation may be acceptable.

One approach that allows low gain/loss operation near line-center (hence retaining large oscillator strengths) is to dynamically switch w. between positive and negative values; such switching speed may still be long compared to $\tau_1$ and $\tau_2$, so that the oscillator's behavior can still be described by the continuous wave relations. While doing this, the excitation input can synchronously switch the source frequency ω complementarily (below and above line-center) such that the net value of refraction, u, remains at the selected value. However, since the state level input is sometimes above and sometimes below line center, gain and loss balance out for zero net effect. Note that, although the pulses are applied sequentially, the pulses are not necessarily periodic. In one approach, the complementary pulses at the two frequencies are applied aperiodically and/or with varying durations with the intensity and duration selected to maintain a desired average net effect. Note that for some excitation levels and oscillator Q's the duration of excitation for each of the frequencies may be on or below the order of milliseconds. Such periods can be below the perception level of human visual or machine vision systems.

In cases where the duration of the opposite excitations produce undesirable artifacts (e.g., where the timing of switching of frequencies correlates to line rates, frame rates or other aspects of displays) the durations and frequencies can be adjusted or varied to compensate or may have aperiodic components.

Short Pulse Operation

In short pulsed operation, the time scale and duty cycle of pulses can be selected to directly control the values of refraction and gain/loss. Such conditions will typically include time scales where $\square$pulse<<$\square_1$ and $\square\square$. Such operation allows coordination between the oscillator dynamics and the timing of pulses to take advantage of specific u and v values. Since the oscillator Q affects the decay rate, the time scales can be affected by the choice of oscillator Q. For example, rare earth atoms may have very long decay rates on the order of milliseconds while other structures may have individual Q values on the order of 10 to 100.

When using short-pulse excitation with a coherent EM field, the oscillators can respond with spatial coherence, greatly magnifying their optical strength. In this case the individual dipole moments add up, creating a global polarization that grows with N, the number of coherent oscillators. This in turn excites E fields which scale as N, and hence light intensities that increase as N2. Over longer, $\square$2, time-scales, the oscillators develop random phases, and so intensities return to N scaling. The size-scale over which the E field, and hence the oscillators, are coherent will generally be ~λ/4, which determines the population N.

Negative Refraction

These oscillators can be used for negative refraction optics by operating them in a u<0 regime. One general CW approach to assure this is simply to operate at a frequency above the oscillator's line-center (ω>$\omega_0$). Short-pulse operation allows u (and hence refraction) to be kept negative despite dynamic oscillator behavior, by properly timing the excitation pulses.

Dynamic Control—Energy Based

Another approach to controlling the optical response of the array can utilize the frequency dependence of the oscillator response. In a straightforward case, the response of the optical properties can be controlled simply by varying the frequency of the excitation energy, within the oscillator's linewidth, hence changing $\square$. This can significantly change the dipole u and v values, which in turn change the optical properties. These shifts can either be parametric, done before a given CW or pulsed application, or can be fully dynamic, changing as a function of time during a pulse.

Another way to dynamically change the optics is by using a separate control field. This is done by exposing the oscillator to two or more EM fields within its linewidth. Metaphorically speaking, one field is the "payload", which is the excitation input that is to be optically processed. The other "control" field(s) act as the principal state level input and may not be meant to be viewed or otherwise processed. They principally control the oscillator's u, v values. Note that, in some cases, it may be desirable to optically process the control input. For example, monitoring the spot size or other characteristics of the state level input after it has passed through the optics can provide information about the level of saturation or other characteristics of the optics. Using a control field in addition to the "payload" or excitation input provides an independent control input that changes the optical control problem from an over-determined case where the output is fully coupled with the system function, to a controllable one.

In one use of this pulsed approach, a first "control" pulse establishes the inversion state and a second operates as the viewable "payload'. The control pulse induces changes in the inversion level. As the inversion level increases or decreases, the values of u, v pass through corresponding ranges. The payload pulses can be timed to arrive when u, v are at the selected values, so that the array responds accordingly. In one approach, the timing is selected such that the selected values correspond to the zero-crossing of v or to times when u matches a desired value (e.g., matches u of surrounding media or corresponds to a desired angle of refraction). If the pulse duration and timing is selected appropriately, a viewer may perceive operation as substantially continuous.

Dynamic Control—Oscillator Parameters

While some of the previously described embodiments have provided a state level control through resonant or near resonant interaction with the oscillators and/or through interaction with electromagnetic fields, other approaches to defining or dynamically controlling the response of individual oscillators or sets of oscillators may be implemented. In one case where the oscillators are artificial oscillators such as quantum dots, the Q and/or central frequency $\bar{\square}$ of the oscillator can be impacted by applying a static or quasi-static electric or magnetic field. Still other approaches include applying strains to supporting structures, applying an acoustic energy input, or other approaches to affecting the oscillator properties.

Even where the oscillators are natural oscillators, the Q and/or central frequency $\square$ can be controlled. One approach is to externally change w• (e.g., by level-pumping). Other approaches use equasi-static electric or magnetic fields, applied strains, applied acoustic energy, or other approaches to affect the oscillator properties. Where such control approaches change the oscillator's natural frequency, $\bar{\square}$ changes $\square$, thereby allowing effects corresponding to those described previously for control through source frequency control.

Nonlinear Optics

While the previously described approaches have applied effects to operation of classical oscillators that are typically linear responses, nonlinear approaches can be defined by considering the oscillators according to the quantum description above. The nonlinearity of the quantum oscillator analysis is discerned from the Bloch equations described previously. This can be seen from the Fv and Fw terms, and in the $u^2+v^2+w^2=1$ constraint. Accordingly, the system response to two fields is not confined to a superposition of separate responses to inputs. Instead, the response to two different excitation signals is a nonlinear function of the combined inputs. For sufficiently large oscillator dipole strengths, the nonlinearity can become a significant and/or dominant effect. The frequencies of operation and inter-frequency coupling of nearby frequencies within the oscillator's linewidth can be treated by the Bloch equations, above, except that analysis of the system with more than one frequency would employ multiple field terms.

While this effect can be employed in a variety of structures, one set of illustrative embodiments applying the nonlinear response provides optical switching. In basic configuration, a beam of excitation energy arriving at an array along a first vector is refracted through a refraction angle θ when the oscillator central frequency $\omega_0$ substantially coincides with the frequency of the excitation energy. When a frequency shifting input is applied to the array, the refractive effect of the array drops and the excitation energy travels unrefracted. In the refracted case, the beam strikes a first location and in the unrefracted case, the beam arrives at a second location spaced apart from the first.

Figure 6:
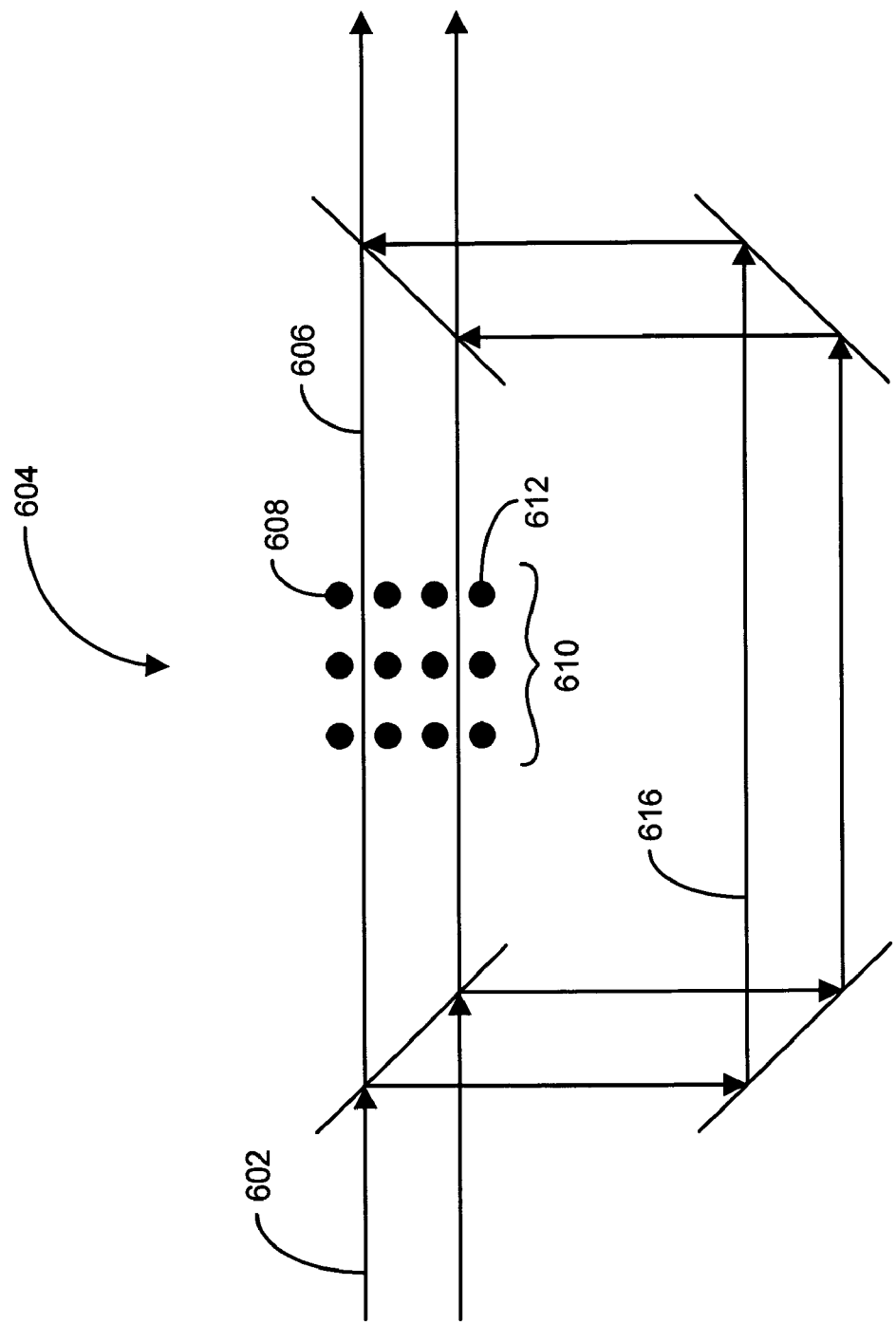
FIG. 6 is diagrammatic representation of an interferometric structure.

While the basic case presented for illustration employs two different levels for a single beam and a frequency shift, a variety of other switching structures can be implemented. For example, an incoming beam may be divided and recombined in an interference structure, such as a Mach-Zender structure 604, shown in FIG. 6, with one portion of the divided beam passing through a portion 608 of an array 610 of oscillators 612. Where the central frequency $\omega_0$ of the oscillators 612 matches the frequency of the incoming beam 602, the phase of the beam portion passing through the array portion will differ from a beam portion 616 not passing through the array portion. When the beam portions are recombined the combination will destructively interfere providing an effective output of zero. Where the central frequency $\omega_0$ of the oscillators differs from the frequency of the incoming beam, the phase of the beam portion passing through the array portion will match the beam portion not passing through the array portion. The recombined beam will constructively combine to produce an input corresponding to a "1."

A variety of other switching structures and switched structures can also be assembled. For example, where the array is configured to provide focusing, switching the central frequency $\omega_0$ of the oscillators changes the optical power of the focusing structure.

While the illustrative examples of switching are described as ON/OFF types of devices, the principles and structures can be operated in analog fashion to provide further measures of control.

Additionally, as noted previously, operation is not limited to the illustrative case of two quantum levels. In some cases, three or more quantum levels can provide further flexibility of operation. For example, operating in three levels can allow nonlinear operation with frequencies that are relatively distant. In one approach to this, a first level input signal may be selected with a frequency selected to drive the quantum level to an intermediate state. A second level input signal at a second frequency can shift the quantum level from the intermediate state to a third state corresponding to the excitation frequency.

Moreover, the level select signal, whether at the frequency of the excitation signal or at a different frequency may be collinear with the excitation signal or in a separate beam. In one approach, the input level select signal may spatially overlap the excitation signal but travel in an opposite direction.

Figure 7:
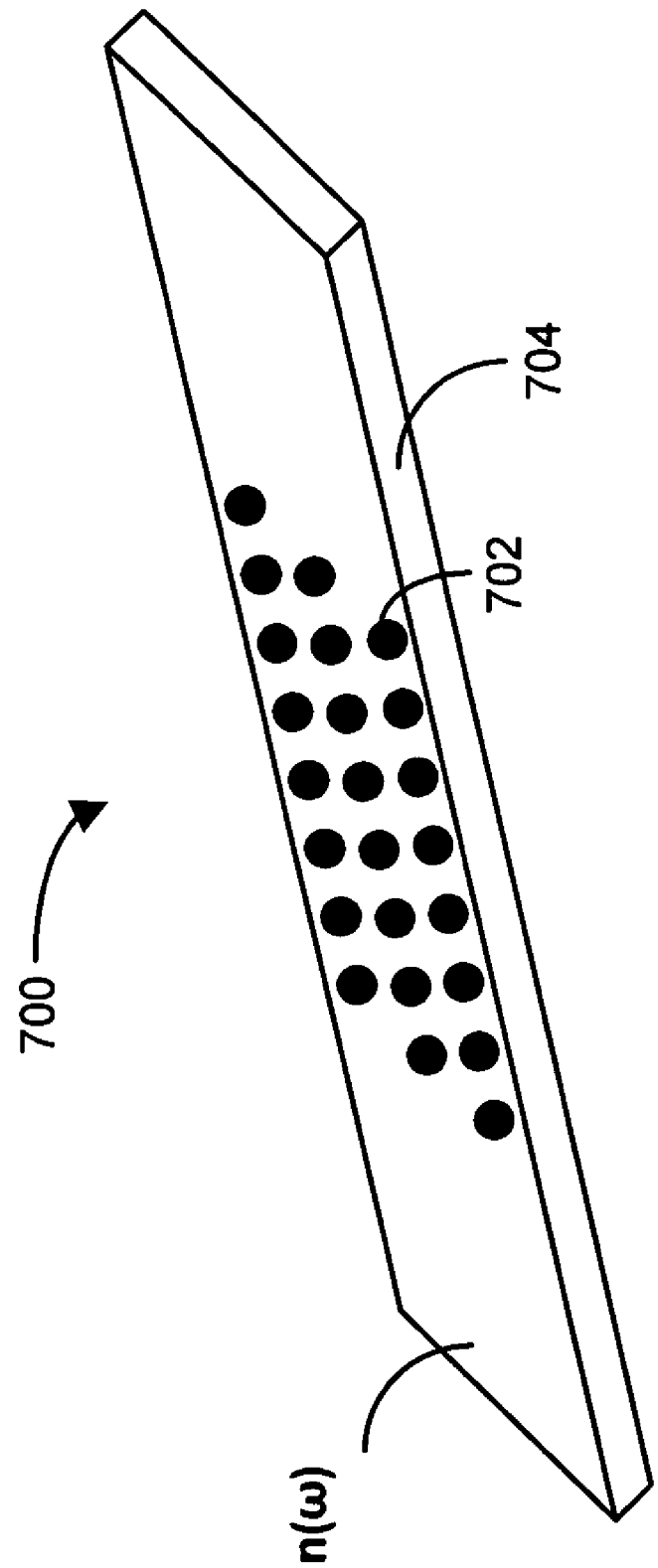
FIG. 7 is an isometric representation of an array of optical elements on a substrate.

While the previous discussion relates primarily to operation at one or more selected frequencies and control of the effective refractive index, the discussion has been mostly generic with respect to illustrative arrangements of oscillators as optical devices. In a first embodiment of an optical device 700, shown in FIG. 7, self-resonant bodies 702, such as rare-earth atoms, act as the oscillators. The self-resonant bodies have a half width including a corresponding range of frequencies as described above with reference to FIG. 2. In one embodiment, the self-resonant bodies interact primarily with electromagnetic energy having wavelengths corresponding to the range of frequencies in the corresponding range of frequencies. Accordingly, the self resonant bodies 702 are configured on a substrate 704 in a regular array to establish an effective index of refraction that can be determined according to the analyses provided hereinabove.

As described previously, the self-resonant bodies impact the direction of propagation of electromagnetic radiation in a range of wavelengths corresponding to resonant frequencies of the self-resonant bodies according to their effective refractive index.

Figure 8:
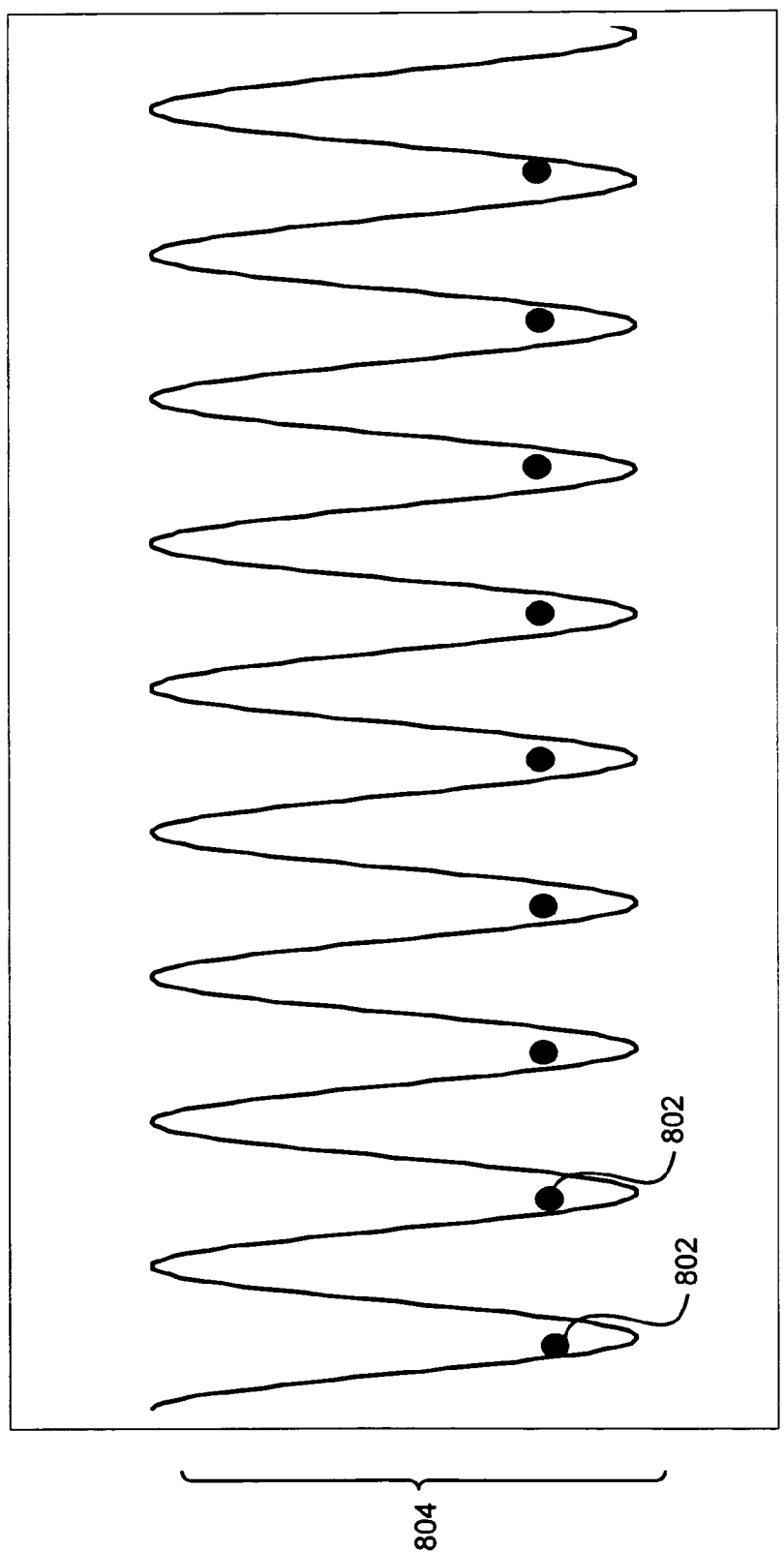
FIG. 8 is a diagrammatic representation of an optical lattice and selected self resonant bodies.

The previous discussion has related primarily to arrangements of oscillators. As presented in FIG. 8, one approach to arranging oscillators according to a defined pattern is to trap a selected set of atoms 802 in an optical lattice 804. While the representation of FIG. 8 presents self-resonant bodies in a one dimensional lattice, 2D and 3D lattices may also be implemented.

Also, trapping a selected set of atoms in an optical lattice has been described for example, in *Creating Ioffe-Pritchard Micro-traps From Permanent Magnetic Film with In-plane Magnetization*, I. Barb et al.; Eur. Phys. J. D 35, 75-79 (2005); *One- and Two-dimensional Optical Lattices on a Chip for Quantum Computing*; Christandl, et al., Phys. Rev. A 70, 032302 (2004), each of which is incorporated herein by reference. Moreover, other approaches to trapping atoms with other types of fields, such as magnetic fields, electrostatic or quasi-static electric or magnetic fields may be implemented.

In still another approach to defining a spatial distribution of oscillators, quantum dots can be arranged according to photolithographic techniques, as described in U.S. Pat. No. 5,482,890 entitled, Method of Fabricating Quantum Dot Structures to Liu, et al., or according to similar techniques such as those described in U.S. Pat. No. 5,532,184 entitled, Method of Fabricating a Semiconductor Device Using Quantum Dots or Wires to Kato, or in U.S. Published Patent Application No. 20050233487 to Liu, et al., entitled Method of Fabricating Quantum Features, each of which is incorporated herein by reference. In yet another approach quantum dot arrays or other structures can be formed by DNA assisted self assembly as described in Wang, C.-J, Lin, L. Y., Parviz, B. A., *Modeling and fabrication of sub-diffraction nano-photonic waveguides constructed via DNA-directed self-assembled quantum dots*, Conference on Lasers and Electro-Optics/Quantum Electronics & Laser Science Conference (CLEO/QELS), Baltimore, Mass., May 22-27, 2005 which is incorporated herein by reference. Similarly, nanoparticles can be bonded to oligonucleotides in a similar fashion to that described in U.S. Pat. No. 6,767,702 to Mirkin, et al, entitled Nanoparticles Having Oligonucleotides Attached Thereto and Uses Therefor, which is incorporated herein by reference. Such approaches can provide a wide range of arrangements with very fine spatial definition as described in "Folding DNA to Create Nanoscale Shapes and Patterns," Paul W. K. Rothemund, Mar. 16, 2006, pp. 297-302, Nature, Vol. 440.

While some of the approaches referenced above concentrate primarily on holding or defining structures on planar surfaces, three dimensional structures may also be implemented. For example, rare earth atoms may be implanted into a host material or within a three dimensional photonic crystal. Other approaches to defining an arrangement of self-resonant bodies may also be implemented. For example, the non-resonant bodies may be located beneath the surface, as described for example in U.S. Pat. No. 6,819,845 to Lee et al, entitled Optical Devices with Engineered Nonlinear Nanocomposite Materials, which is incorporated herein by reference.

Additionally, while the illustrative examples refer to arrays of oscillators in selected patterns, the patterns themselves may be dynamic. For example, the oscillator positions may change in a controllable fashion as described in Cižmár et al, *Optical Conveyor Belt for Delivery of Submicron Objects Applied Physics Letters,* 86, 174101 (2005).

Much of the discussion herein relates to structures and methods for designing such structures, as well as systems incorporating such structures. Those having skill in the art will recognize that the state of the art has progressed to the point where, at the systems or component level of electrical circuitry, as such may be incorporated into systems involving the structures herein, there is little distinction left between hardware and software implementations of aspects of systems. In such contexts, the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. Those skilled in the art will recognize that optical aspects of implementations will typically employ optically-oriented hardware, software, and or firmware.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into optical, microwave or other systems. That is, at least a portion of the devices and/or processes described herein can be integrated into larger systems via a reasonable amount of experimentation. Those having skill in the art will recognize that a typical optical or other electromagnetic system, or apparatus or system incorporating optical or other electromagnetic elements generally includes one or more of refractive, diffractive or other types of lenses, apertures, beam directors, such as mirrors or prisms, couplers, modulators, beamsplitters, beam combiners, filters, optical sources such as lasers or LEDs, microwave or RF sources, such as antennas and modulators, and power sources.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, it will be understood that various changes, substitutions and alterations can be made to the disclosed embodiments without departing from the principles, spirit and scope of the disclosure herein.

For example, in the preceding description, reference has been made to exemplary self-resonant bodies as having a low Q, a larger Q (e.g., in a range from about 100 to 1,000), and high Q values (e.g., on the order of 1,000 to 10,000). It will be understood that the electromagnetically responsive assemblies, arrays, structures, and/or elements having self-resonant bodies, which are described above, are not limited to the exemplary self-resonant bodies having low, larger, or high Q values. The electromagnetically responsive assemblies, arrays, structures, and/or elements may, within the principles, spirit and scope of the present disclosure, include self-resonant bodies having higher or ultra-high Q values (e.g., on the order of $10^5$-$10^{12}$).

Higher and ultra-high Q resonators are described, for example, in K. J. Vahala, *Optical microcavities*, Nature, vol. 424, No. 6950, August 2003. The cited reference, in particular, describes microsphere, microcavity, microdisk, microtorroid, microring, and other resonator geometries having higher or ultrahigh Q values (e.g., $10^4$-$10^9$). These resonators (which are collectively referred to herein as "microring/microcavity resonators) may operate by confining resonant energy to small volumes by recirculation on closed loop paths. A. B. Matsko, A. A. Savchenkov, D. Strekalov, V. S. Ilchenko, *Review of Applications of Whispering-Gallery Mode Resonators in Photonics and Nonlinear Optics*, IPN Progress Report, 2005—tmo.jpl.nasa.gov, provides further description of higher and ultrahigh Q-value resonator structures. In particular, the reference describes the microcavity/microring resonators, and further describes morphology-dependent resonators (e.g., total internal reflection and whispering-gallery mode (WGM) resonators). Demonstrated WGM resonators can have very high Q values (~$10^{12}$).

Like the microcavity/microring resonators, the morphology-dependent resonators may have a monolithic ring design or topology, and operate by confining resonant energy by recirculation on closed loop paths. For convenience, all types of higher and ultra-high Q value resonators may be referred to herein as "closed-loop resonators."

A plurality of closed-loop resonators may be arranged in structures in one or more groups to collectively interact with, and be responsive to, incident electromagnetic energy.

Individual closed-loop resonators may be fabricated as a single or monolithic structure from suitable dielectric materials. The resonators may have any shape (e.g., tori, spheres, ellipsoids, funnels, disks, rings) suitable for sustaining closed-loop resonant modes. The resonator structures may include tuning elements for modifying or tuning resonant modes. The tuning elements may, for example, utilize piezoelectric effects, thermal effects or mechanical micro positioning to modify the resonator shapes. One or more closed-loop resonators may have structures that lead to "overmoding," i.e., the frequency differences between adjacent modes are less than the spectral width of a single mode, so that the spectral peaks of adjacent modes overlap. An overmoded resonator may have a continuous modal spectrum accompanied by ultrahigh-Q frequency-independent quality factors. See e.g., A. A. Savchenkov, A. B. Matsko, and L. Maleki, "White-light whispering gallery mode resonators," Opt. Lett. 31, 92-94 (2006).

FIG. 9 shows an exemplary structure 900, which includes an array (902) of microring/microcavity resonators 910 arranged to collectively interact with, and be responsive to, incident electromagnetic energy. The individual resonators may, for example, have one or more high or ultra high Q resonant modes. One or more of resonators 910 may be coupled to one or more tuning elements 920 that are operable to modify resonant modes of the resonators. A tuning element may, in response to a control signal, tune/detune a resonance line center frequency $\omega_c$, and/or change a resonance Q-factor.

Resonators 910 in array 902 may exhibit inter-resonator interactions or couplings, which may depend on individual resonator types, modes and Q-values, inter-resonator spacings or distances, and resonator orientations. The distribution or pattern (e.g., number, type, spacing, and orientations) of resonators in array may be selected so that structure 900 has a particular group or collective response to electromagnetic energy. Array 902 of microcavity/microring resonators has a spatial pattern that corresponds to the effective index of refraction of the structure.

For example, structure 900 may have a particular permittivity $\in(\omega)$ and/or an effective index of refraction $n(\omega)$ for received electromagnetic energy at a selected frequency. Accordingly, structure 900 may modify or refract received electromagnetic energy 950 as shown, for example, in FIG. 9.

Each microcavity/microring resonator 910 in array 902 has a line center frequency substantially at the selected frequency, a respective set of electromagnetic parameters, and a Q-factor. Further, resonators 910 in array 902 may have an inter-resonator coupling that is determined at least in part by separations between substantially adjacent ones of the resonators. The spatial pattern of resonators 910 in array 902 may be a function of the inter-microcavity/microring resonator coupling, in addition to being a function of the effective index of refraction, the electromagnetic parameters, and the respective Q-factors.

Further, resonators 910 in array 902 may have spectral responses that are a function of resonator orientation, and each resonator in structure 900 may be oriented in a respective direction relative to received electromagnetic energy. Structure 900 may have a strong anisotropy due to the resonator orientations.

FIG. 10 shows an exemplary closed-loop resonator-based apparatus 1000, which interacts with incident electromagnetic energy. Apparatus 1000 includes a plurality of coupled closed-loop resonators 1010 distributed in a region 1020. The resonators are distributed in the region in a selected spatial arrangement so that the apparatus collectively exhibits a particular effective refractive index $n(\omega)$ to incident electromagnetic energy.

Closed-loop resonators 1010 in apparatus 1000 may be of any suitable types including, for example, whispering-gallery-mode, disk, cavity, and ring resonator types. Each resonator 1010 has a resonant spectral response/mode characterized by a quality factor $Q(\omega_c)$, where $\omega_c$ is a resonance line center frequency. At least one closed-loop resonator 1010 may have a Q factor greater than $10^4$. Several of the closed-loop resonators may have substantially the same resonance line center frequency $\omega_c$.

One or more closed-loop resonators 1010 may have a shape (e.g., spherical or ellipsoidal) that enables coupling of the resonator modes to free space modes. Further, one or more pairs of resonators may have an inter-resonator coupling that is a function of a distance between the resonators and the respective resonator orientations.

As noted previously with respect to structure 900, apparatus 1000 may have a strong anisotropy due to resonator orientations in region 1020. A particular distribution of inter-resonator spacings and resonator orientations may be selected so that apparatus 1000 has a particular anisotropic effective refractive index $n(\omega)$. Conversely, a particular distribution of inter-resonator spacings and resonator orientations may be selected so that the particular effective refractive index $n(\omega)$ is substantially isotropic.

With respect to resonant modes, at least one closed-loop resonator 1010 may have a substantially isolated (i.e., not overlapping) resonant mode centered at about the resonance line center frequency $\omega_c$ having a halfwidth of about $\Delta\omega$. Further, closed-loop resonators 1010 may be distributed in region 1020 so that apparatus 1000 has a narrow band response to incident electromagnetic energy, the narrow band response having a halfwidth which is proportional to $\Delta\omega$.

Further, a multiplicity of closed-loop resonators 1010 may have respective resonance line center frequencies coc that are sufficiently closely spaced so that their respective resonances substantially overlap over a range of frequencies R, with the overlapping resonances having a combined spectral halfwidth of about R. The closed-loop resonators 1010 may be distributed in region 1020 so that apparatus 1000 has a broad band response to incident electromagnetic energy, the broad band response may have a halfwidth which is proportional to the combined spectral halfwidth of about R.

Alternatively or additionally, at least one closed-loop resonator 1010 may have an overmoding structure so that a number N of individual resonant modes, each having a respective halfwidth $\delta\omega$, substantially overlap. In this case, closed-loop resonators 1010 may be distributed in region 1020 so that apparatus 1000 has a broadband response to incident electromagnetic energy, the broadband response having a halfwidth which is which is proportional to $N*\delta\omega$.

High-Q overmoding in apparatus 1000 may lead to a slow ring-up or response of resonators 1010 in region 1020. Optionally, region 1020 may be pre-pumped at one or more frequencies (corresponding to the N individual resonant modes) to speed up the ring-up or response of apparatus 1000 if so desired.

Resonators 1010, like resonators 910, may be coupled to one or more resonance tuning elements. A tuning element may be a piezoelectric element, a thermal element, or a mechanical micropositioner. The tuning element may be configured to tune or detune a resonance of at least one resonator 910. Tuning or detuning a resonance may involve shifting the resonant frequency and/or adjusting the resonance Q-value. The tuning elements may, for example, selectively tune or detune resonances/resonators 110 so that at a particular time t the resonances are substantially at the same line center frequency $\omega_c$, or substantially overlap over a range of frequencies R, as desired.

The tuning elements may tune/detune resonators 1010 in response to a control signal. Resonators 1010 in apparatus 1000 may be tuned/detuned so that a permittivity $\in(\omega)$, or the effective refractive index $n(\omega)$, of apparatus 1000 is modulated according to the control signal (e.g., a time-dependent modulation function).

Further, the tuning elements may selectively modify resonances/resonators 110 (e.g., tune/detune resonance frequencies and/or change Q) in a time-dependent manner so that the resonances/resonators are coupled together on a timescale faster than their decay time to get control over the resonators response behaviors.

In apparatus 1000, region 1020 may be any medium which supports the distribution of closed-loop resonators 1010 therein. The medium may include any suitable materials or structures compatible with the materials, structures and operations of resonators 1010. Suitable materials may, for example, include polymer materials and substrates. Further, the medium may, for example, include a substrate on which resonators 1010 are fabricated.

In an embodiment of apparatus 1000, the medium supporting closed-loop resonators 1010 may be a substrate 1030 having one or more elastic or flexible portions 1040. Flexible substrate 1030 may be configured to flex and change the relative positions and/or orientations of at least a pair of coupled closed-loop resonators in response to a control signal. Substrate 1030 may, for example, be a Micro-Electro-Mechanical System (MEMS) substrate having a foldable or movable silicon membrane portion or cantilever 1040, which mechanically supports at least one resonator 1010. Movement of foldable silicon membrane portion 1040 may be actuated by piezoelectric or other suitable means.

In general, the plurality of closed-loop resonators that are arranged in a structure (e.g., array 900 or apparatus 1000) to be responsive to, or interact with, incident electromagnetic energy may include mechanisms (e.g., tuners, and mechanical repositioners) to controllably change or adjust the structure properties (e.g., electromagnetic properties) presented to, or seen by, the incident electromagnetic energy. For example, the closed-loop resonators may be re-oriented to make the structure's response or interaction more or less anisotropic as desired. Such changes may be made, at least in part, in consideration of incident electromagnetic energy characteristics (e.g., polarization, direction, and/or intensity). Further, the changes or adjustments to the structure may be anticipatory or a dynamic response to incident electromagnetic energy characteristics.

The exemplary microring/microcavity and closed loop self-resonators described above enable methods for controlled interaction with electromagnetic energy. Methods for modifying propagation of an electromagnetic energy wave at a selected frequency may include refracting the electromagnetic energy wave, for example, with microcavity/microring resonator array 900, or apparatus 1000 having a selected distribution of closed-loop resonators 1010.

The various aspects and embodiments disclosed herein are for purposes of illustration and are not intended to be limiting, with the true scope and spirit being indicated by the following claims.

The invention claimed is:

1. A method for controlling the effective index of refraction of an array of coupled closed-loop resonators for incident electromagnetic energy at a selected frequency, each closed-loop resonator having a time-dependent resonance at a resonance line center frequency $\omega_c$ substantially at the selected frequency and having a respective set of electromagnetic parameters, and a Q-factor, the method comprising:

modifying the closed-loop resonators' resonances in response to an input signal, thereby changing the effective index of refraction of the array of coupled closed-loop-resonators.

2. The method of claim 1, wherein modifying the closed-loop resonators' resonances comprises at least one of tuning/detuning resonance line center frequency $\omega_c$, changing a resonance Q-factor, or a combination thereof.

3. The method of claim 2, further comprising, tuning the closed-loop resonators' resonances so that the resonances are substantially at the same line center frequency $\omega_c$ at a particular time t.

4. The method of claim 2, further comprising, tuning the closed-loop resonators so that at a particular time t their resonances substantially overlap over a range of frequencies R.

5. The method of claim 2, further comprising, tuning/detuning the resonators in a time-dependent manner so that the array of coupled closed-loop resonators modulates the incident electromagnetic energy according to an input signal.

* * * * *